D. G. EDWARDS.
DUSTING MACHINE.
APPLICATION FILED JAN. 29, 1920.
1,373,317.
Patented Mar. 29, 1921.
2 SHEETS—SHEET 2.
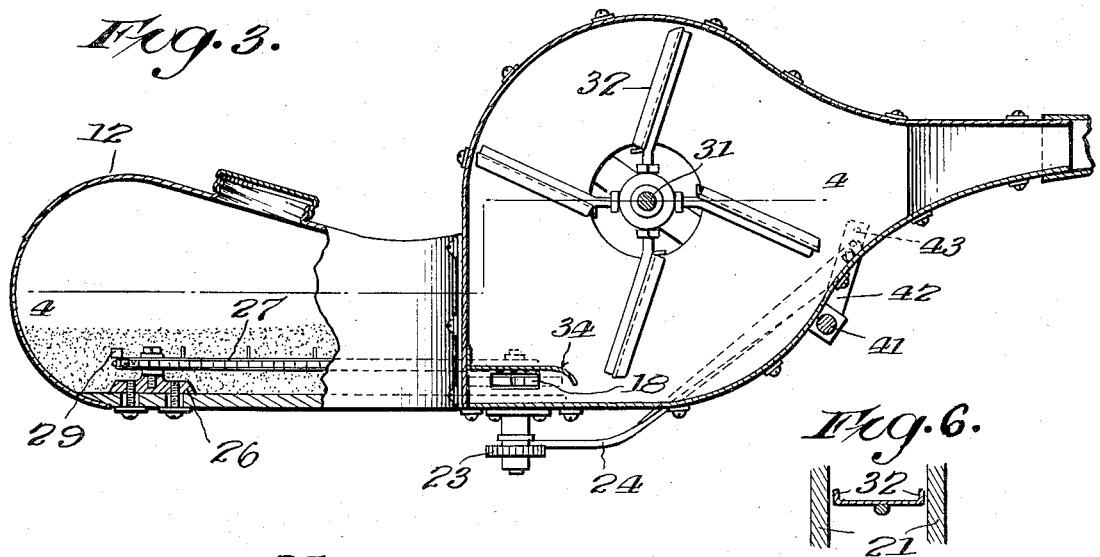
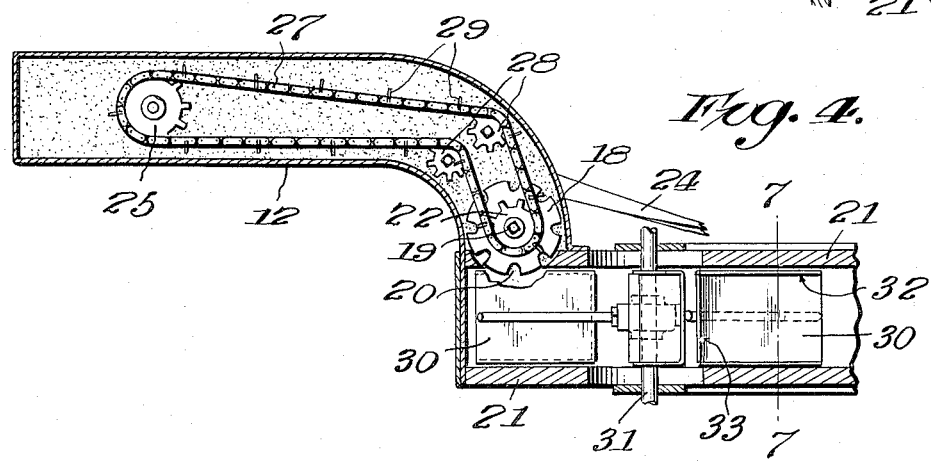
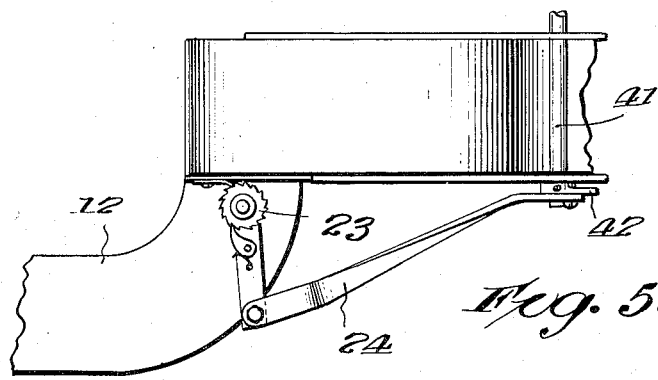
INVENTOR.
Daniel Gordon Edwards,
By Prentiss, Stone & Boyden,
ATTORNEYS.

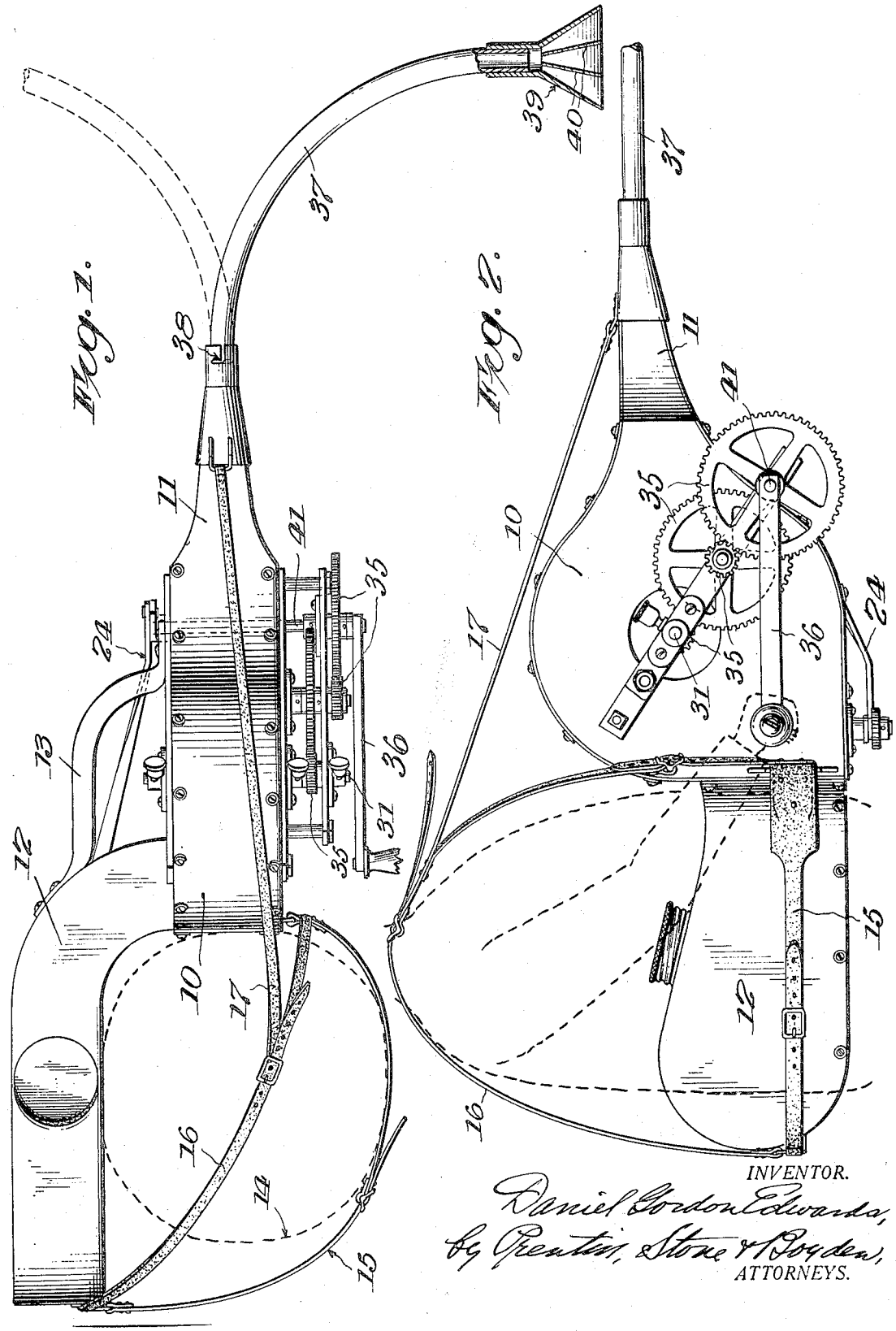

UNITED STATES PATENT OFFICE.

DANIEL GORDON EDWARDS, OF HOPKINSVILLE, KENTUCKY.

DUSTING-MACHINE.

1,373,317.  Specification of Letters Patent.  Patented Mar. 29, 1921.

Application filed January 29, 1920. Serial No. 354,811.

*To all whom it may concern:*

Be it known that I, DANIEL GORDON EDWARDS, a citizen of the United States, residing at Hopkinsville, in the county of Christian and State of Kentucky, have invented certain new and useful Improvements in Dusting-Machines, of which the following is a specification.

My invention relates to the application of powders to plants and vines for the purpose of killing or checking the growth of insects, scales, fungi and other parasites which are or may be injurious or detrimental to the plant or vine.

While certain features of my machine are capable of general application to various types of machines and apparatus, the principal features are peculiarly adapted to that type of machine designed to be carried by the operator and secured to his body; the impelling blast for the powder being produced by a blast fan or other blower manually operated.

The principal objects of the invention are to balance and distribute the weight of the apparatus by having it partially encircle the body of the user, and at the same time cause the operation of the apparatus to be more convenient and less tiresome; to efficiently agitate the powder in the powder container throughout that portion thereof which partially encircles the body; to provide a regulatable and positive feed of the powder to the blast fan in such a manner that various kinds of powder may be used in a single machine without clogging; to provide for the delivery of the powder by the blast fan blades in a most efficient manner, and also by rotation of the fan in either direction; and to make it possible to deliver the powder to the next row of plants at either side and a little in advance of the operator, thus enabling the operator to avoid the poisonous dust. These and further objects will more fully appear hereinafter.

The invention consists in the novel construction and arrangement of parts hereinafter described and shown in the accompanying drawings, which illustrate a preferred embodiment of the invention.

In the drawings—

Figure 1 is a plan view of the apparatus, the location of the body of the operator being indicated in dotted lines;

Fig. 2 is a view in side elevation of the apparatus shown in Fig. 1, the outer portion of the delivery tube being broken away;

Fig. 3 is a longitudinal vertical section through the blower casing, a portion of the powder supply box being broken away to show the interior arrangement;

Fig. 4 is a horizontal section taken on the line 4—4 of Fig. 3;

Fig. 5 is an inverted plan view of the blower casing and a portion of the powder supply box showing the operating connection of the feed and agitator mechanism;

Fig. 6 is a fragmentary view showing a section taken on line 7—7 of Fig. 4.

Referring to the drawings, in which the same parts are indicated by like reference characters throughout the various figures, 10 indicates a blower casing which in this instance incloses a rotary blower. This casing has a forward delivery end 11 to which a suitable delivery tube may be attached as hereinafter described.

12 indicates a powder supply box, which as shown is attached to the rearward portion of the blower casing and extends laterally and rearwardly therefrom. The powder supply box is braced with respect to the blower casing, by means of brace, 13, so as to hold the parts rigidly in their relative positions. It will be observed that the powder supply box connects to the side of the rearward portion of the blower casing, this being the preferred arrangement, and also that the said powder supply box curves outwardly and rearwardly, so as to partially encircle the body of the operator, the location of the latter being indicated by dotted line 14.

The apparatus is intended to be suspended from the shoulders or otherwise suitably secured to the body of the operator, as by straps 15, 16 and 17, and when thus carried the blower extends forwardly from the body, with the powder supply box partly encircling the body and positioned under one arm.

The method of agitating the material within the powder supply box, and of feeding said material to the blower casing constitutes an important feature of the invention. This is accomplished by means of the following elements. Mounted within the powder supply box is a feed disk 18 mounted upon a vertical spindle 19, and having its periphery notched as at 20 and extending through the wall between the blower and the powder supply box. It will be observed that the side walls 21 of the blower, which may be of wood, are shown relatively thick as compared with the peripheral walls which are of metal.

Adjacent the feed disk 18 and preferably just above the same, a spindle 19 carries a sprocket gear 22, which, together with said feed disk is driven through ratchet wheel 23 by lever 24, connected to the blower driving gear in any suitable manner, as hereinafter indicated.

Within the powder supply box is also located an end sprocket 25, carried upon an adjustable standard 26, so that the tension of sprocket chain 27 may be readily adjusted. This sprocket chain passing around sprockets 22 and 25, and also around the bend in the powder box by engagement with idlers 28. Sprocket chain 27 carries agitating members 29, which assist in the agitation of the material within the box.

The location of the agitating mechanism above described is preferably in the lower portion of the powder supply box, so that said box may be as nearly emptied as possible in the operation of the machine.

Within the blower casing 21 the blower is shown as comprising blades 30 mounted on axle 31 and each extending a little to the rearward of a radial position. Each blade is provided with laterally up-turned flanges 32 in close proximity to the side walls of the casing, and an additional flange 33 along the inner edge of the blade in proximity to the axle, the three flanges forming a shallow receptacle, upon the outer end of the blade, for the purpose of receiving and efficiently delivering the powdered material to the delivery end of the casing.

Immediately above the feed disk 18 is a guard 34 to protect said feed disk from the direct blast from the fan blades.

Fan axle 31 is driven by a train of gears 35 and operating crank 36 in the hand of the operator. Owing to the formation of the blower casing 10, the forward portion of which curves outwardly from the blower axle on either side, the blower is operative in either direction of rotation. That is, instead of having the casing tangential at one side of the delivery end, it is provided with a peripheral inward concavity upon each side of the delivery end, whereby the material may be delivered in either direction of rotation of the blower blades.

At the delivery end 11 of the blower casing, a delivery tube 37 is attached in any suitable manner, as by a double bayonet joint 38, by which latter, the said tube may be attached to the casing to deliver to either side of the line of movement thereof, the tube, itself, being curved, so as to deliver approximately in a direction at right angles to the direction of movement of the machine. At its outer end the delivery tube is provided with a nozzle 39 having distributing flanges 40, to assist in scattering the delivered material over a larger area.

Spindle 41 of the blower driving gears is extended across beneath the blower casing, and carries an arm 42, having a plurality of perforations 43, to which the arm 42 may be connected at varying distances from the spindle 41, in order to vary the actuation of the feed disk 18, and hence the amount of material fed to the blower casing during a given number of rotations of the blowers. It will thus be seen that the actuation of the feed disk is step by step and in accordance with the requirements of the operator.

The operation of the machine is obvious from the foregoing description, but may be briefly described as follows:

The operator steadying the apparatus by one hand, grasps the handle of the operating crank 36 with the other, and turns the crank in either direction. The powder supply box extending under one arm distributes and assists in balancing the weight of the parts and in holding the machine straight out in front of the operator. As the blower is driven by gears 35, the material within the powder supply box is agitated by sprocket chain 27 and member 29, so as to keep the material loosened and in condition to fill the pockets of feed disk 18, these latter supplying said material into the side of the blower casing at the rear in any desired amount, where it is taken up by the blast of the fan and delivered to the delivery tube at the forward end of the casing. By this arrangement it will be seen that the backward blow of the blower into the powder supply box is prevented, and the material is positively and regularly fed to the blower. By this arrangement the well known varieties of poisons, such as Paris green, arsenate of lead, calcium arsenate of lead, and others may be used in the machine with equal efficiency and effectiveness.

It will be observed that the delivery tube is retained to deliver to either side at will, thereby enabling the operator to adjust the same in accordance with the wind in order that he may avoid the poisonous dust during operation of the machine.

While I have described and illustrated in accordance with the patent statute what I believe to be the best embodiment of my invention, I wish it understood that many changes in details of construction may be made without departing from the invention, and such changes I aim to include within the scope of the appended claims.

Having described my invention, what I claim as new, and desire to secure by Letters Patent of the United States, is:—

1. The combination with a blower having a casing, of a powder supply box connected to said casing and curving laterally and rearwardly therefrom, and means for supporting said parts with said blower in front of an operator and said powder box extending at the side toward the rear.

2. The combination with a blower having a casing and a forward delivery end, of a powder supply box connected to said casing and curved laterally and rearwardly therefrom, and means within said powder supply box to feed material therein positively into said blower casing.

3. The combination with a blower having a casing, of a powder supply box connected at the side of the rearward portion of the casing and extending laterally and rearwardly to partially encircle the body of an operator.

4. The combination with a rotary blower having a casing, of a powder supply box connected at one side of the rearward portion of the casing and extending laterally and rearwardly therefrom, and means within said powder supply box to feed material therein positively into the side of said blower casing.

5. The combination with a rotary blower having a casing, of a powder supply box connected at one side of the rearward portion of the casing and extending laterally and rearwardly therefrom, drive means for said rotary blower, means within said powder supply box to feed material therein positively into the side of said blower casing, and a drive connection between said drive means and said powder feeding means.

6. The combination with a rotary blower having a casing, of a powder supply box connected to the rearward portion of said casing and extending laterally and rearwardly therefrom, a feed disk within said powder supply box, having pockets to deliver material into the blower casing.

7. The combination with a rotary blower having a casing, of a powder supply box connected at one side to the rearward portion of said casing, and extending laterally and rearwardly therefrom, a feed disk having pockets for retaining material and delivering the same at the side of said blower within said casing, and means for operating said feed disk.

8. The combination with a rotary blower having a casing, of a powder supply box connected at one side to the rearward portion of said casing and extending laterally and rearwardly therefrom, an agitator within said powder supply box for agitating material within the box and delivering the same toward said blower casing, and feeding means for positively supplying said material to said blower casing.

9. The combination with a rotary blower having a casing, of a powder supply box connected at one side to the rearward portion of said casing and extending laterally and rearwardly therefrom, a sprocket chain feeding device within said powder supply box, coöperating sprockets at substantially each end of said powder supply box in the lower portion thereof upon which said sprocket chain is mounted, idlers around which said chain passes, at the bend in said box, means for feeding material from the powder supply box into said blower casing, and means for operating said sprocket chain and feeding means.

10. The combination with a rotary blower having a casing, of a powder supply box connected at one side to the rearward portion of said casing and extending laterally and rearwardly therefrom, a sprocket chain mounted to travel longitudinally within the lower portion of said powder supply box, a sprocket at each end of said powder supply box around which said chain passes, a feed disk mounted adjacent the sprocket next to said blower casing and having pockets for supplying material to said blower casing, and means for operating said sprocket and feed disk.

11. The combination with a rotary blower having a casing, of a powder supply box connected at one side to the rearward portion of the casing, and extending rearwardly therefrom, means within said powder supply box to feed material therein positively into the side of said blower casing, actuating mechanism for said blower, and a ratchet drive connection between said blower actuated mechanism and said feeding means.

12. The combination with a rotary blower having a casing, of a powder supply box connected at one side to the rearward portion of the casing, and extending rearwardly therefrom, means within said powder supply box to feed material therein positively into the side of said blower casing, actuating mechanism for said blower, and an adjustable throw ratchet actuation between said blower actuated mechanism and said feeding means.

13. The combination with a blower having a casing with a forward delivery end, of a powder supply box connected to said casing, means within said powder supply box to feed material therein positively into said blower casing, and a delivery tube at said forward end of the blower casing curved to deliver material laterally to plant rows and at an angle to the direction of movement of the apparatus.

14. The combination with a blower having a casing with a forward delivery end, of a powder supply box connected to said casing, means within said powder supply box to feed material therein positively into said blower casing, and a delivery tube at said forward end of the blower casing curved to deliver material laterally and reversibly so as to deliver to either side of the line of movement of the apparatus.

In testimony whereof I affix my signature.

DANIEL GORDON EDWARDS.